US006737443B1

(12) United States Patent
Liang

(10) Patent No.: US 6,737,443 B1
(45) Date of Patent: May 18, 2004

(54) LIGNIN BASED COLLOIDAL COMPOSITIONS

(75) Inventor: Zhi-Zhong Liang, Richmond Hill (CA)

(73) Assignee: Polyphalt Inc., Toronto (CA)

( * ) Notice: Subject to any disclaimer, the term of this patent is extended or adjusted under 35 U.S.C. 154(b) by 0 days.

(21) Appl. No.: 09/622,781

(22) PCT Filed: Feb. 22, 1999

(86) PCT No.: PCT/CA99/00155

§ 371 (c)(1),
(2), (4) Date: Nov. 20, 2000

(87) PCT Pub. No.: WO99/42576

PCT Pub. Date: Aug. 26, 1999

Related U.S. Application Data

(60) Provisional application No. 60/075,546, filed on Feb. 23, 1998.

(51) Int. Cl.[7] .............................. B01F 3/12; C08L 1/00; C08L 95/00; C09D 195/00; C09J 195/00
(52) U.S. Cl. ............... 516/31; 106/123.11; 106/123.13; 106/DIG. 7; 162/171
(58) Field of Search ................... 516/31; 106/123.13, 106/DIG. 7, 123.11; 162/171

(56) References Cited

U.S. PATENT DOCUMENTS

| 1,738,798 | A | * | 12/1929 | Richter et al. | ......... 106/123.11 |
| 3,345,193 | A | * | 10/1967 | Pitchford | ............... 106/123.11 |
| 3,956,002 | A | * | 5/1976 | Moorer | ........................ 516/51 |
| 4,293,459 | A | * | 10/1981 | Detroit | .................. 106/123.13 |
| 5,053,080 | A | * | 10/1991 | Gaidis | ........................ 106/278 |
| 5,686,512 | A | * | 11/1997 | Liu | ............................. 524/145 |

FOREIGN PATENT DOCUMENTS

| CA | 1163758 | * | 3/1984 |
| WO | WO 00/28135 | * | 5/2000 |

* cited by examiner

Primary Examiner—Daniel S. Metzmaier
(74) Attorney, Agent, or Firm—Sim & McBurney

(57) ABSTRACT

Methods for making the stable dispersion of lignin components of black liquor in bitumen. Representative methods comprising converting an aqueous colloidal dispersion of lignin in spent pulping liquor to an anhydrous colloidal dispersion of lignin in a lubricating oil by mixing a lubricating oil with the spent pulping liquor, and dewatering the mixture so formed at an elevated temperature to form a cream-like paste compatible with bitumen, and mixing said anhydrous colloidal dispersion of lignin with bitumen.

24 Claims, No Drawings

LIGNIN BASED COLLOIDAL COMPOSITIONS

REFERENCE TO RELATED APPLICATIONS

This application is a U.S. national phase application under 35 U.S.C. 371 of PCT/CA99/00155 filed Feb. 22, 1999 claiming priority under 35 USC 119(e) from U.S. Provisional Patent Application No. 60/075,546 filed Feb. 23, 1998.

FIELD OF INVENTION

The present invention relates to the processing of black liquor and the preparation of bitumen compositions containing black liquor.

BACKGROUND TO THE INVENTION

Black liquor is an aqueous alkaline pulping residue produced in Kraft pulping of wood chips in a pulp mill to provide wood fibers for paper-making. Black liquor generally contains about 55 to 65% solids comprising lignin, sodium salts of poly-saccharinic acids, organic and inorganic sulfides and carbonates and many other compounds. The lignin in the black liquor is the main organic component and is present as a high mass colloid stabilized by ionized phenolic groups. Lignin is a phenylpropane polymer of amorphous structure comprising about 17 to about 30% of wood. Lignin is so closely associated with the cellulosic fibres and hemi-cellulose that makes up the balance of woody material that lignin can be separated from wood only by chemical reaction at high temperature, such as that used in the Kraft pulping process, wherein wood chips are digested with an aqueous alkaline solution of sodium hydroxide and hydrogen sulfide, known as white liquor. Normally, the black liquor, after separation of the wood fibers, is processed to remove organic materials and to recover and regenerate pulping chemicals. Lignin can be recovered from wood-processing wastes only in limited quantities.

The lignin is a natural binder derivative of wood. Alkali lignin from both softwoods and hardwoods are useful in many products. They are used as stabilizers for asphalt emulsions, modifiers and extenders for latex emulsions, compounding agents in vinyl plastics, soil conditioners, binders in printing inks, wood stains, protective colloids in soap emulsions, dispersing agents for clay, fire foam stabilizers, drilling mud additives, insecticide dispersants, absorbers in storage batteries and foundry sand binders. Alkali lignin can also be used as adhesives for plywood, molding powers and formed insulating resins and as a reinforcing agent for rubber.

Asphalt binders (or bitumen) are widely used in different applications, such as asphalt-aggregate blends for road paving, asphalt fiber reinforced membranes for roofing and asphalt-water emulsions in surface treating both for paving and roofing. Problems for straight-run asphalt in those applications are the tendency to become brittle at low temperatures and to become soft at high temperatures, the tendency to flow under constant load at service temperatures and the tendency to phase separation during storage when mixed with other components.

Various approaches have been used for the purpose of improving asphalt compositions to address these problems. For instance, polymers have been utilized to improve the high and low temperature characteristics of asphalt compositions, as well as to improve their toughness and durability. Air blowing of straight-run asphalt has been used to improve stiffness and dimensional stability for hot applied roofing systems. The asphalt may be treated with acid to improve its compatibility with the polymeric additives. Lignin or lignin based additives have been widely used to emulsify asphalt to achieve a stable dispersion of asphalt in aqueous medium.

Black liquor is an aqueous colloidal system in which ample lignin is present. However, means have not been previously disclosed whereby a stable dispersion of lignin in asphalt can be achieved by combining black liquor with hot liquid asphalt. When the black liquor is added to the bitumen and dispersed with agitation into molten asphalt cement, de-watering of the black liquor occurs while lignin and other salts in the black liquor tend to form large, rigid aggregates which separate from the liquid asphalt and subsequently strongly resist dispersion in the asphalt.

It is the objective of the present invention to develop a process or processes whereby liquor-solid pulping residue (black liquor) can be converted from one in which water is the dispersing and plasticizing agent to one in which water is replaced by oil, achieving a dispersion in which a lignin based colloidal particulate phase is stably maintained. It is another objective to provide a lignin-oil dispersion which can be smoothly blended with liquid asphalt to produce a stable, homogeneous dispersion.

SUMMARY OF INVENTION

The present invention relates to compositions and methods for combining black liquor with selected petroleum-derived products. More specifically, this invention provides two separate processes for preparing lignin-based colloidal dispersions in lubricating or other petroleum-based oils. The lignin-oil colloidal dispersions prepared by either of such processes may be blended with bitumen to produce novel bituminous composition. Two embodiments of such procedures are described herein. The black liquor used in the invention may be that resulting from cooking wood in an alkaline solution in the soda or sulfate (Kraft) paper-making process.

The asphalt employed in this invention can be any of the well known bituminous substances derived from petroleum, shale oil, coal tar and the like. Commonly, the asphalt is prepared by vacuum distillation of a topped crude oil. Preferably, the asphalt has a penetration at 25° C. (as determined by ASTM D5) ranging for about 20 to about 400.

In a first embodiment of the invention, the procedure involves essentially two steps. In the first step, the black liquor is converted from its aqueous colloidal system to an anhydrous colloidal dispersion in a lubricating oil medium in which a surfactant, which may be an anionic surfactant, such as DDBSA (dodecylbenzene sulfuric acid), is used to promote the provision of the anhydrous colloidal dispersion. The process may be effected under low shear conditions.

The anhydrous colloidal dispersion of lignin in oil may be mixed, in a second step, with asphalt bitumen, producing a unique combination, which is a novel bituminous composition.

In another embodiment of the invention, the procedure again involves essentially two steps. First, bitumen is treated with an inorganic acid, such as sulfuric acid, at elevated temperature to provide an acid-treated bitumen. The black alkaline liquor is then added slowly to the acid-treated bitumen under agitation for de-watering the black liquor at a controlled rate to form a stable, substantially anhydrous, colloidal dispersion of lignin in the bitumen, also to provide a novel bituminous composition.

Accordingly, in another aspect of the present invention, there is provided a bituminous composition comprising bitumen, and dewatered lignin-containing spent alkaline pulping liquor dispersed therein. The dewatered spent alkaline pulping liquor may be present in an amount up to about 50 wt. % of the bitumen, preferably about 5 to about 25 wt. % of the bitumen.

In such composition, the dewatered spent alkaline pulping liquor may comprise an anhydrous colloidal dispersion of lignin in a lubricating oil. The dewatered spent alkaline pulping liquor may comprise a stable, substantially anhydrous, colloidal dispersion of lignin in the bitumen.

DETAILED DESCRIPTION OF THE INVENTION

Referring first to the first embodiment of the invention, a lubricating oil is mixed with black liquor at temperatures below the water boiling point. A surfactant, which may be DDBSA (dodecylbenzene sulfuric acid), is selected to be added to the mixture to facilitate the colloidal dispersion of black liquor in the lubricating oil while de-watering is gradually carried out at an elevated temperature. The dewatering may be effected by starting at an elevated temperature, which may be about 100° to about 180° C., preferably about 110° to about 160° C. The resulting cream-like paste product is miscible with hot liquid asphalt at any ratio to form a novel bituminous composition.

The lubricating oil used in the first embodiment of the invention may be a re-refined waste motor oil or other convenient petroleum-based oil. Contaminants of waste motor oil, such as dirt, lead, arsenic and other harmful metals and chemicals, are removed from the waste motor oil to produce a clean base lubricating oil by the re-refining process.

The lubricating oil may be a selected fraction of refined mineral oil used for lubrication of moving surfaces. Such fraction may range in consistency from thin liquid to grease-like substances. Usually, lubricating oils contain small amounts of additives to impart special properties, such as viscosity index and detergency.

The surfactant or dispersing agent used in the process may typically be dodecylbenzene sulfuric acid (DDBSA), although other anionic surfactants may be employed, if desired, such as fatty acid, linear alkyl sulfonates having 10 or more carbon atoms in the chain. DDBSA is benzene with dodecene, and the resulting dodecylbenzene is sulfonated. DDBSA may be neutralized with caustic soda from the alkaline black liquor or other convenient source to promote the detergency of the lubricating oil and to reduce surface tension in the mixture.

However, a surfactant need not always be necessary, if the lubricating oil employed has a detergency high enough to ensure that a colloidal dispersion of the solid residue from the black liquor is achieved in the lubricating oil medium.

The lignin-oil dispersion produced by either of these procedures may be smoothly blended with bitumen to provide the desired lignin-asphalt composition. The spent pulping liquor, which may be black liquor from a kraft pulp mill, may be present in an amount of about 25 to about 60 wt. % of the composition, preferably about 25 to 40 wt. % of the composition.

Referring now to the second embodiment of the invention, the bitumen first is treated with a strong mineral acid, such as sulfuric acid, at elevated temperature and then the alkaline black liquor is added to the treated bitumen at a controlled rate under agitation to effect de-watering of the black liquor to form a stable, substantially anhydrous, colloidal dispersion in the bitumen. The elevated temperature may be about 100° to about 180° C., preferably about 110° to about 160° C. The spent pulping liquor may be present in an amount of about 5 to about 50 wt. % of the composition, preferably about 10 to about 30 wt. %

An inorganic acid is contacted with, or added to, the asphalt to form an acid treated asphalt. In general, the acid addition shifts the asphalt structure from a sol to a gel, lowers the temperature susceptibility of the asphalt and improves the stability of the additive dispersion in the treated asphalt. Since black liquor is an aqueous alkaline system, it is critical that the acid not be added to the asphalt after addition of or with the black liquor.

Preferably, the acid is added slowly to the asphalt to avoid foaming, which may occur if all the acid were added at one time. The inorganic acid content of the asphalt resulting from the acid treatment is not critical, but normally is in the range between about 0.2 and about 3.5 wt %, preferably between about 0.5 and about 2.5 wt % of the asphalt. Although a wide variety of inorganic acids can be used for treatment of the asphalt, the inorganic acid is preferably selected from the group consisting of sulfuric acid, phosphoric acid, poly-phosphoric acid, phosphorous pentoxide, hydrochloric acid, and mixtures thereof. The sulfuric acid, phosphoric acid or poly-phosphoric acid are preferred inorganic acids, with the sulfuric acid being particularly preferred.

Following acid addition, the alkaline black liquor is then added slowly to the acid-treated bitumen at an elevated temperature, typically around 100° C., under agitation for a certain period of time to permit de-watering of the black liquor to occur while the solids are incorporated into the bitumen. The temperature of the final composition next is increased above the boiling point of water, typically up to around 160° C. until residual water is completely evaporated off to form a stable, substantially anhydrous, colloidal lignin dispersion in the bitumen.

EXAMPLES

Example 1

This Example illustrates the first embodiment of the invention in which black liquor first dispersed in a lubricating oil and then in bitumen.

General Procedure:

Black liquor and DDBSA were mixed at room temperature in specific proportions under stirring for 20 to 30 min to form a mixture. Re-refined waste lube-oil was added into the mixture at room temperature to a desired concentration and stirred another about 20 min. The resulting mixture was heated slowly to about 160° to 180° C. for about 2 to 3 hours under stirring until water-free. During this step, the viscosity of the system exhibited complex phenomena because a raising of the temperature resulted in reduced viscosity while water loss resulted in increased viscosity. Accordingly, the temperature and time for de-watering must be controlled.

Specific Experiments:

16 Kg of DDBSA was added to 266 g of black liquor (ca. 60% solid content) and stirred at room temperature for 20 to 30 min. 184 g of reclaimed lube oil were added and stirred again at room temperature for 20 to 30 min. The temperature of the mixture was slowly raised from room temperature to 170° C. for 2 to 3 hours to de-water the composition. After de-watering and cooling, about 332 g sample was obtained. The sample was a black colored paste and water-free and was easily dispersed into asphalt at any ratio. This sample was designated as B-14, seen in Table 1.

Different black liquor/lube oil formulations have been prepared following the above procedure and the data are presented in the following Table 1:

TABLE 1

NON-AQUEOUS DISPERSING SYSTEM OF BLACK LIQUOR/LUBE OIL

| Sample Code | Black liquor g | DDBSA g | DDBSA wt % | Lube Oil g | Lube Oil wt % | Product Wt. g |
|---|---|---|---|---|---|---|
| B-13 | 246 | 24 | 4.6 | 254 | 48.5 | 410 |
| B-14 | 266 | 16 | 3.4 | 184 | 39.5 | 332 |
| B-15 | 218 | 6.0 | 1.94 | 180 | 44.6 | 302 |
| B-19 | 336 | 10 | 2.15 | 120 | 25.8 | 308 |
| B-20 | 460 | 14 | 2.35 | 122 | 20.5 | 372 |
| RB-30 | 590 (1 part) | 17.7 (0.03 part) | | 413 (0.7 part) | | |

Note:
Mass of analyzed sample of reclaimed lube oil (recovered from engine oil) was determined following the test method of ASTM 4124-92.

Base asphalt (or bitumen used in the present invention were selected from three different degrades: AC-5 having an absolute viscosity of around 500 poises, I85/100 having a 25° C. penetration range from 65 mm to 100 mm and I120/160 having a 25° C. penetration range from 100 dmm to 150 dmm. The non-aqueous dispersing system of black liquor/lube-oil produced as described in the Table 1 was dispersed into hot liquid asphalt at about 160° C. respectively to form a very fine dispersion mixture. The stability of these lignin based bituminous mixtures during hot storage at elevated temperature was evaluated using a conditioned tube test. The conditioning procedure consists of placing approximately 70 g of the mixture of ¼" aluminum tubes and storing such tubes in a vertical position at 165° C. in an oven for 48 hrs. Following hot storage, a viscosity ratio was determined by comparing the viscosity of the mixture tested at 135° C. from the bottom section of the sample and from the top section of the sample in the tube. A ratio in the range of 0.80 to 1.20 is generally considered acceptable with respect to separation of the dispersed phase. The testing results on eight compositions are shown in the following Table 2. The results indicate that the lignin based solid dispersion in asphalt binder are quite stable.

Example 2

This Example illustrates the second embodiment of the invention in which bitumen first is acidified.

General Procedure:

Sulfuric acid (95 to 98% $H_2SO_4$) was added into hot asphalt AC-5 at 100° to 118° C. under stirring (800 to 1000 RPM) for 20 to 30 mins. to form an acid-modified asphalt, followed by addition of aqueous black liquor (c.a. 60% solid content) into the acid-modified asphalt, according to the following procedure.

(1) While stirring at 800 to 1000 RPM, the acid was added into asphalt at 100° to 110° C. for 20 to 30 min. and acid-modified asphalt was obtained.

(2) After 20 to 30 min., black liquor was added to the acid-modified asphalt at 105° to 116° C. for 30 to 40 min., then maintained for 1 to 2 hours for dewatering.

(3) The temperature was slowly increased to 170° C. while stirring for 1 to 2 hours to effect further dewatering.

(4) The composition was allowed to cool and was sampled for stability.

Specific Experiments:

To 392 g of asphalt AC-5 were added 3.14 g of $H_2SO_4$ (0.8% AC-5) at 100° to 110° C. under 800 to 1000 RPM stirring for 20 min. The acidified asphalt was maintained at 100° to 110° C. and black liquor 84 g (22% AC-5) was added over about 30 min., and then the composition was maintained for 1 to 2 hrs at 105° to 116° C. to dewater the black liquor. The temperature was raised to 170° C. while stirring to effect further dewatering. The product was then cooled to provide 436 g of product (loss mass 43 g). The stability index determined on this sample (AC-B-18) was 0.94, shown in Table 3.

Results of dispersion and stability determinations are also shown below in the following Table 3. The results shown in Table 3 indicate that products of formulation containing 0.8 wt % acid and 0 to 20 wt %, preferably 15 to 25 wt % black liquor, based on the amount of asphalt, had good stability.

TABLE 2

STABILITY OF THE BLACK LIQUOR/LUBE OIL BLEND (BLR) IN HOT ASPHALT

| | Asphalt | | BLR | | | Viscosity, cp at 135° C. | |
|---|---|---|---|---|---|---|---|
| Code | Name | (g) | Code | (g) | (%) | Top/Bottom | Stability Index* |
| AH5-16 | AC5 | 368 | B-13 | 38 | 10 | 455/463 | 0.98 |
| B14-85-10 | 185/100 | 90 | B-14 | 10 | 10 | 387.5/432.5 | 0.98 |
| B14-85-20 | 185/100 | 80 | B-14 | 20 | 20 | 450/465 | 0.87 |
| B14-85-30 | 185/100 | 70 | B-14 | 30 | 30 | 435/500 | 0.87 |
| B15-A | I120/150 | 70 | B-15 | 30 | 30 | 825/845 | 0.97 |
| B15-B | I120/150 | 85 | B-15 | 15 | 15 | 257/265 | 0.97 |
| B20-20 | I120/150 | 80 | B-20 | 20 | 20 | 740/802.5 | 0.92 |
| RB30-30 | I120/150 | 80 | BB-30 | 20 | 20 | 105/475 | 0.89 |

Note:
(1) In the better formulations of the non-aqueous dispersing system, an appropriate composition was a lube oil content of more than 20% and DDBSA content of greater than 2%.
(2) DDBSA is dodecylbenzene sulfuric acid.

$$\text{StabilityIndex} = \frac{\text{Viscosity at top}}{\text{Viscosity at bottom}}$$

TABLE 3

EXPERIMENTAL FORMULATIONS AND STABILITY

| | Asphalt (AC-5) | Acid | | Black Liquor | | Viscosity op after 48 hrs. storage at 160° C. | | Stability |
|---|---|---|---|---|---|---|---|---|
| Code | (g) | (g) | (%) | (g) | (%) | Top | Bottom | Index |
| AC-B-24 | 374 | 0 | 0 | 112 | 30 | Sediment appealed[1] | | |
| AC-B-11 | 472 | 2.4 | 0.5 | 94 | 20 | 413 | 550 | 0.75 |
| AC-B-10 | 362 | 4.0 | 1.1 | 72 | 20 | 298 | 310 | 0.96 |
| AC-B-18 | 392 | 3.14 | 0.8 | 84 | 22 | 338 | 358 | 0.94 |
| AC-B-25 | 294 | 2.35 | 0.8 | 59 | 20 | 312.5 | 317.5 | 0.98 |
| AC-B-26 | 288 | 2.3 | 0.8 | 72 | 25 | 360 | 342.5 | 1.05 |
| AC-B-19 | 360 | 2.94 | 0.8 | 110 | 30 | 270 | 598 | 0.45 |
| AC-B-23 | 380 | 3.8 | 1.0 | 114 | 30 | 290 | 907.5 | 0.32 |
| AC-B-21 | 360 | 4.32 | 1.2 | 108 | 30 | 377.5 | 360 | 1.05 |
| AC-B-22 | 373 | 3.73 | 1.0 | 149 | 40 | 300 | 402.5 | 0.75 |
| AC-B-20 | 380 | 3.0 | 0.8 | 190 | 50 | 267.5 | 1060 | 0.25 |

Note: [1]No measurement was possible.

SUMMARY OF THE DISCLOSURE

In summary of this disclosure, the present invention provides novel procedures for the stable dispersion of lignin components of black liquor in bitumen. Modifications are possible within the scope of the invention.

What I claim is:

1. A method of producing a bituminous composition, which comprises:
   converting an aqueous colloidal dispersion of lignin in spent pulping liquor to an anhydrous colloidal dispersion of lignin in a lubricating oil by mixing a lubricating oil with the spent pulping liquor, and
   dewatering the mixture so formed at an elevated temperature to form a cream-like paste compatible with bitumen, and
   mixing said anhydrous colloidal dispersion of lignin with bitumen.

2. The method of claim 1 wherein said mixing step is effected in the presence of a surfactant to facilitate colloidal dispersion of the spent pulping liquor in the lubricating oil.

3. The method of claim 2 wherein said surfactant is an anionic surfactant.

4. The method of claim 3, wherein the anionic surfactant is dodecylbenzene sulfonic acid.

5. The method of claim 1 wherein said spent pulping liquor is black liquor from a Kraft pulp mill.

6. The method of claim 1 wherein the spent pulping liquor is present in the aqueous colloidal suspension in an amount of about 10 to about 60 wt %.

7. The method of claim 6 wherein the spent pulping liquor is present in the aqueous colloidal suspension in an amount of about 25 to 40 wt %.

8. A method of producing a composition, which comprises:
   converting an aqueous colloidal dispersion of lignin in spent pulping liquor to an anhydrous colloidal dispersion of lignin in a lubricating oil, and
   blending the anhydrous colloidal dispersion of lignin in a lubricating oil with bitumen.

9. A method of producing a bituminous composition, which comprises:
   converting an aqueous colloidal dispersion of lignin in spent alkaline pulping liquor to an anhydrous colloidal dispersion of lignin in a lubricating oil, and
   mixing said anhydrous colloidal dispersion of lignin with bitumen.

10. The method of claim 9 wherein said spent alkaline pulping liquor is black liquor from a Kraft pulp mill.

11. The method of claim 9 wherein said converting step is effected by dewatering at elevated temperature.

12. The method of claim 11 wherein said elevated temperature is about 100° to about 180° C.

13. The method of claim 12 wherein said temperature is about 110° to about 160° C.

14. A method of producing a bituminous composition which comprises:
   treating bitumen with an inorganic acid at an elevated temperature to provide acid-treated bitumen,
   slowly adding to the acid-treated bitumen a lignin-containing spent alkaline pulping liquor, while agitating the bitumen to effect controlled dewatering of the spent pulping liquor to form a stable, substantially anhydrous colloidal dispersion of lignin in the bitumen.

15. The method of claim 14 wherein said inorganic acid treatment of bitumen is effected to convert the bitumen structure from a sol to a gel, lower the temperature susceptibility of the asphalt and improve the stability of the additive dispersion in the treated bitumen.

16. The method of claim 15 wherein said inorganic acid is added slowly to the bitumen at an elevated temperature to avoid foaming to provide an inorganic acid content of said bitumen of about 0.2 to about 3.5 wt %.

17. The method of claim 16 wherein said inorganic acid content is from about 0.5 to about 2.5 wt % of the bitumen.

18. The method of claim 14 wherein said inorganic acid is sulfuric acid.

19. The method of claim 14 wherein said addition step is effected by:
   initially slowly adding the spent alkaline pulping liquor to the acid-treated bitumen at substantially water boiling temperature while agitating the bitumen to effect an initial dewatering of the alkaline spent pulping liquor, and
   subsequently increasing the temperature of the bitumen above the water boiling point to effect a further dewatering of the bitumen to form the stable, substantially anhydrous, colloidal dispersion of lignin in the bitumen.

20. The method of claim 14 wherein said spent alkaline pulping liquor is black liquor from a Kraft pulp mill operation.

21. The method of claim 14 wherein said elevated temperature is about 100° to about 180° C.

22. The method of claim 21 wherein said temperature is about 110° to about 160° C.

23. The method of claim 14 wherein the spent pulping liquor is present in an amount of about 5 to about 50 wt % of the composition.

24. The method of claim 14 wherein the spent pulping liquor is present in an amount of about 10 to about 30 wt %.

* * * * *